Aug. 15, 1939.   H. M. SCULL   2,169,294
METHOD AND SYSTEM OF MOTOR CONTROL
Filed Dec. 4, 1936   3 Sheets-Sheet 1

INVENTOR
Herbert M. Scull
BY
Robert A. Lavender
ATTORNEY

Aug. 15, 1939.    H. M. SCULL    2,169,294
METHOD AND SYSTEM OF MOTOR CONTROL
Filed Dec. 4, 1936    3 Sheets-Sheet 2

INVENTOR
Herbert M. Scull
BY
Robert A. Lavender
ATTORNEY

Patented Aug. 15, 1939

2,169,294

UNITED STATES PATENT OFFICE 2,169,294

METHOD AND SYSTEM OF MOTOR CONTROL

Herbert M. Scull, United States Navy

Application December 4, 1936, Serial No. 114,113

16 Claims. (Cl. 172—274)

(Granted under the act of March 3, 1883, as amended April 30, 1928; 370 O. G. 757)

My invention relates to a method and a system for controlling the speed and direction of rotation of a commutator motor.

It is an object of my invention to provide a method for controlling the speed and direction of rotation of a commutator motor having field and armature windings by energizing one of said windings with an alternating current, energizing the remaining winding with an intermittent, pulsating direct current, and adjusting the phase of one current with respect to that of the other.

It is another object of my invention to provide a method for controlling the speed and direction of rotation of a commutator motor which besides the previously mentioned steps incorporates the additional step of varying the amplitude of the intermittent, pulsating, direct current.

A further object of my invention resides in the provision of a method for controlling the speed and direction of rotation of a commutator motor having field and armature windings by energizing one of said windings with an alternating current, energizing the remaining winding with an intermittent, pulsating, direct current of a frequency higher than that of the alternating current, and adjusting the phase of one current with respect to that of the other.

It is another object of my invention to provide a simple, convenient, and effective method for controlling the speed and direction of rotation of a commutator motor having field and armature elements by energizing one of the elements with an alternating current and energizing the remaining element with an intermittent pulsating, direct current, the currents of energization being of selected phase, frequency, and amplitude.

My invention also contemplates the provision of a system for controlling the speed and direction of rotation of a commutator motor having field and armature elements wherein means is provided for energizing one of said elements with an alternating current and the remaining element with an intermittent, pulsating, direct current of selected phase, frequency, and amplitude with respect to the alternating current.

Another object of my invention resides in the provision of a simple and compact system for controlling the speed and direction of rotation of a commutator motor having armature and field windings wherein means is provided for energizing one of said windings with an alternating current and the remaining winding with an intermittent, pulsating, direct current of selected phase and frequency with respect to the alternating current.

These and other objects and many of the attendant advantages of my invention will become better understood and appreciated by reference to the following description and drawings, wherein.

Figure 3:
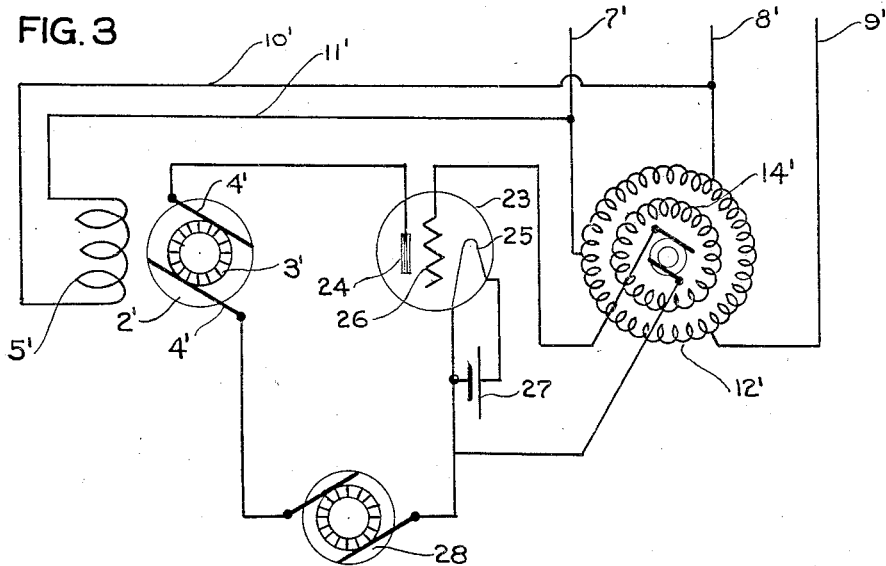
Figure 4:
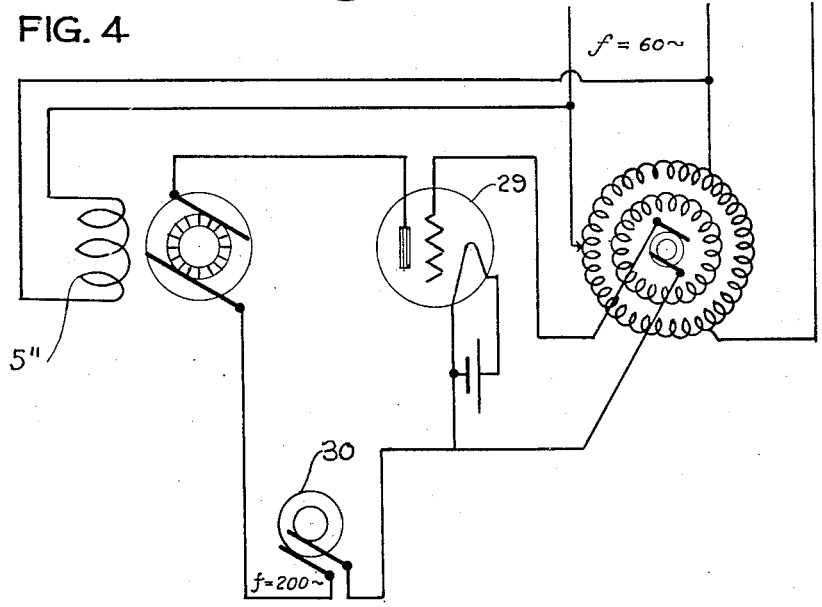
Figure 5:
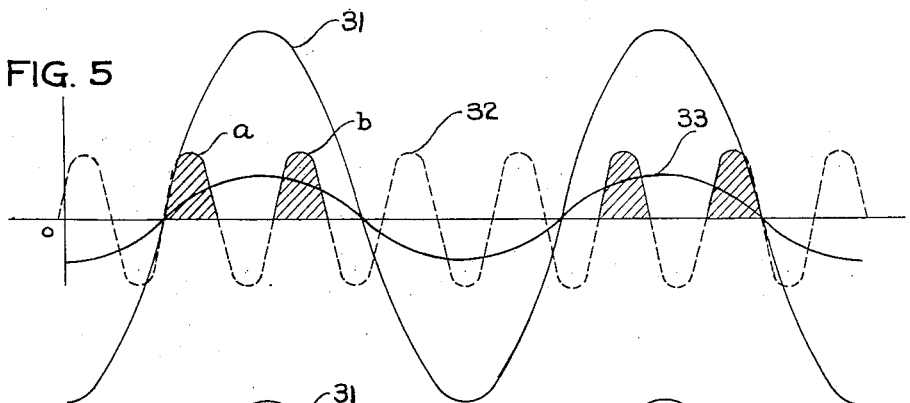
Figure 5A:
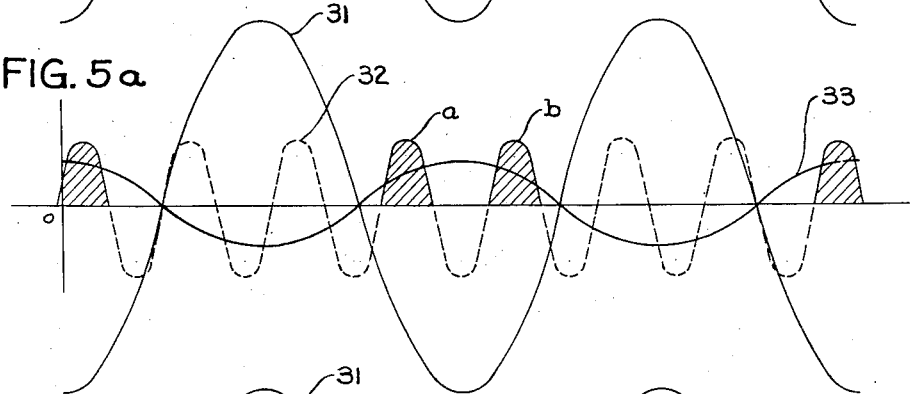
Figure 5B:
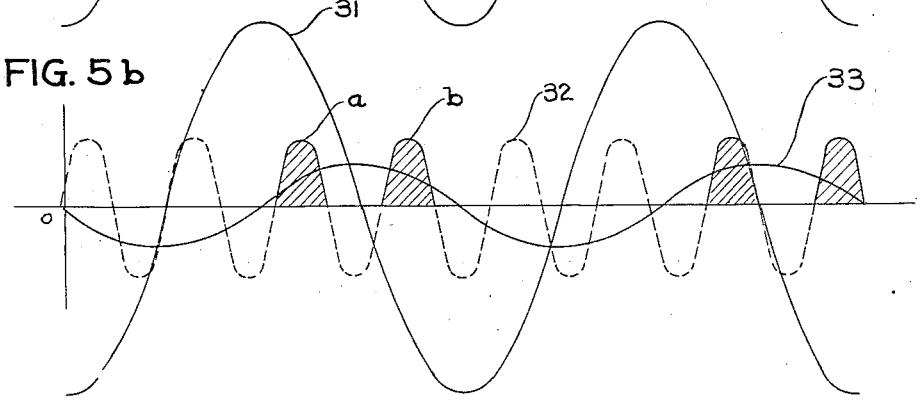

Fig. 3 discloses another embodiment of my motor control system employing a three-electrode space discharge device and a source of substantially constant voltage in the plate circuit thereof;

Fig. 4 represents diagrammatically a still further embodiment of my motor control system which includes as a part thereof a three-electrode space discharge device and a source of alternating current in its plate circuit, the source of alternating current having a frequency different from that empolyed in energizing the field winding;

Fig. 5 shows the phase relation of the field flux, the grid voltage, and the intermittent, pulsating, direct, armature current when the motor rotation is in one direction in the system of Fig. 4;

Fig. 5a shows the phase relation of the field flux, the grid voltage and the intermittent, pulsating, direct, armature current when the motor rotation is in the reverse direction in the system of Fig. 4; and Fig. 5b shows the phase relation of the field flux, the grid voltage, and the intermittent, pulsating, direct, armature current in the system of Fig. 4 at which no motor rotation occurs.

Figure 1:
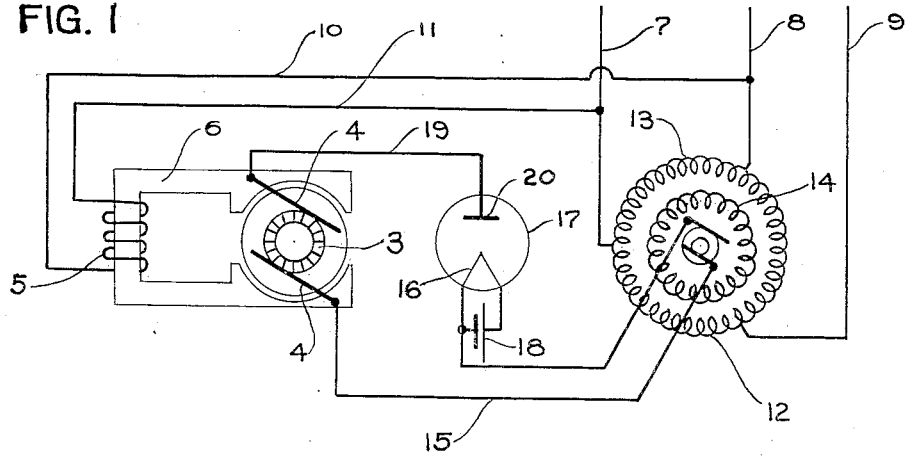
Fig. 1 shows one embodiment of my motor control system employing a half-wave, thermionic rectifier.

In Fig. 1 there is shown a commutator motor 1 provided with a suitably wound armature 2, a commutator 3, brushes 4, and a field structure comprising the winding 5 surrounding one leg of a two-pole laminated yoke 6. It is, of course, apparent to those skilled in the art that the field structure is not limited to the one shown but that any other type of field structure having more than two poles may be employed without departing from the spirit and scope of the invention. The winding 5 of the field structure is connected to one phase of the three-phase alternating current mains 7, 8, and 9 by the conductors 10 and 11.

The numeral 12 denotes in general a phase modifier which comprises a stator 13 adapted to be energized by the three-phase mains 7, 8, and 9 and a rotor 14 rotatably mounted within said stator for furnishing a source of single phase alternating current having the desired phase relation with respect to that energizing the field winding 5. One of the rotor or output terminals of the phase modifier is connected to a brush 4 of the motor by a conductor 15 and the remaining terminal is in circuit with the cathode 16 of a half-wave thermionic rectifier 17, the cathode, as shown, being heated to an electron emitting temperature by a battery 18 or other suitable source of electrical energy. The armature circuit of the motor is completed by the conductive connection 19 between the anode 20 of the rectifier and the other motor brush 4.

While I have shown a specific form of phase modifier and half-wave rectifier for illustrating the invention, it is to be understood that any other convenient means known to the prior art may be used for shifting the phase of the armature current with respect to that energizing the field winding and for securing half-wave rectification.

If the armature of a commutator motor, as shown in Fig. 1, were supplied with a steady direct current and the field thereof excited with alternating current, no rotation of the armature would ensue but a vibration of the armature would be produced depending upon the frequency of the current energizing the field, the inertia of the armature, and other factors. When, however, an intermittent, pulsating, direct current of selected phase relation with respect to the alternating magnetic flux generated by the alternating current energizing the field is supplied to the armature, rotation may result in either direction provided the proper phase relations have been established between the alternating magnetic flux and the intermittent, pulsating, direct current energizing the armature.

Figure 2:
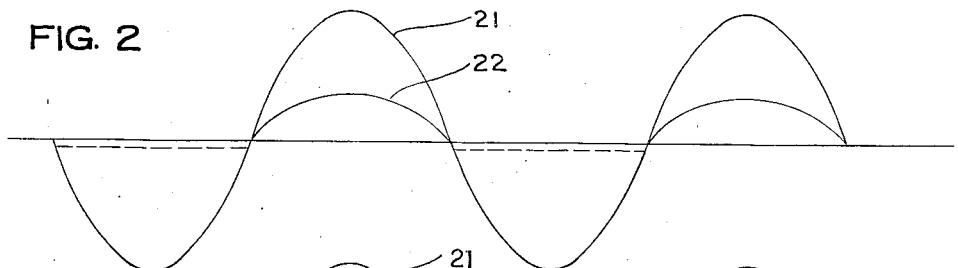
Fig. 2 shows the phase relation of the field flux and the intermittent, pulsating, direct, armature current when the motor rotation of the system of Fig. 1 is in one direction.
Figure 2A:
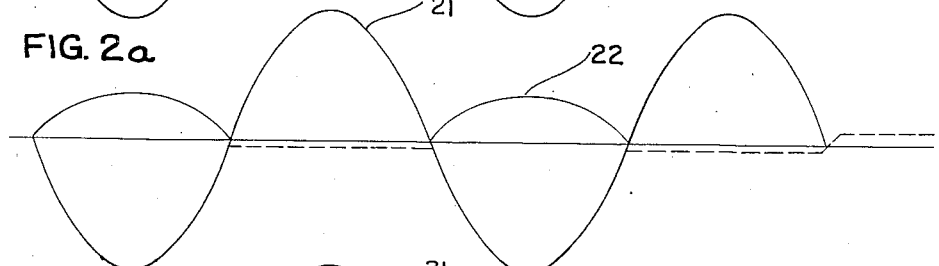
Fig. 2a shows the phase relation of the field flux and the intermittent, pulsating, direct, armature current when the motor rotation in the system of Fig. 1 is in the reverse direction.
Figure 2B:
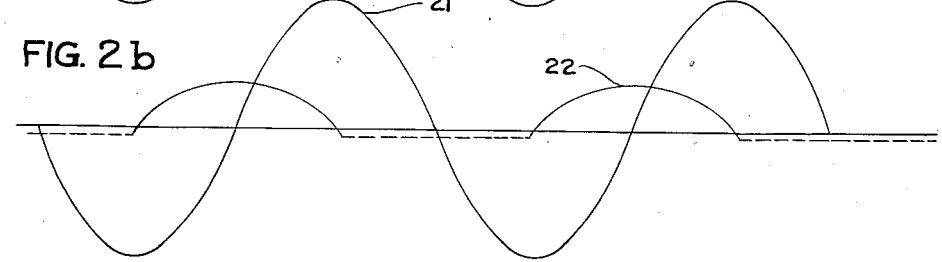
Fig. 2b shows the phase relation of the field flux and the intermittent, pulsating, direct, armature current in the system of Fig. 1 at which no motor rotation will occur.

With these preliminary observations in view, the operation of the motor control system in Fig. 1 may be explained by the aid of the field flux and armature current curves of Figs. 2, 2a, and 2b. Upon setting the system in operation, the single phase alternating current energizing the field coil 5 will generate an alternating magnetic flux in the pole yoke 6 which is represented by the sinusoidal curve 21 in Figs. 2, 2a, and 2b. The half-wave rectifier 17 will rectify the single phase, alternating current output of the phase modifier 12 and energize the motor armature with an intermittent, pulsating, direct current. By adjustment of the phase modifier, the phase of its output current relative to that of the alternating current energizing the field winding and, hence, relative to the phase of the magnetic flux generated by said field current may be selected. In Figs. 2, 2a, and 2b the intermittent, pulsating, direct current energizing the armature is represented by the curve 22.

When, now, the intermittent, pulsating, armature current is in phase with the positive half-cycles of the alternating magnetic flux, as shown in Fig. 2, the motor will rotate in what may arbitrarily be termed the positive direction, but when the armature current is in phase opposition to the negative half-cycles of the alternating magnetic flux, as disclosed in Fig. 2a, the rotation will be reversed and in a negative direction. Fig. 2b shows the phase relation between the alternating magnetic flux and armature current at which no rotation will take place since the armature current is flowing during equal intervals of positive and negative field flux. Intermediate phase adjustments between that shown in Fig. 2b, on the one hand, and Figs. 2 and 2a, on the other hand, will provide varying speed and torque values. Furthermore, variation in amplitude or in the root mean square value of the armature current pulsations may be employed for additionally controlling the speed and torque of the motor. Thus, by shifting the phase of the intermittent, pulsating, direct, armature current with respect to the phase of the alternating current energizing the field and, hence, with respect to the flux generated thereby, complete control of the motor may be obtained without the aid of any mechanical switching devices.

It is to be emphasized that within the scope and purview of my invention the currents supplied to the field and armature windings in the system of Fig. 1 may be interchanged. That is, the field winding 5 may be energized with an intermittent, pulsating, direct current and the armature 2 with a single phase alternating current without changing the mode of operation of my system and without sacrificing any of the flexibility of motor control.

The embodiment shown in Fig. 3 is similar to that disclosed in Fig. 1 except that the armature of the motor is energized by a source of direct current which is periodically interrupted by a three-electrode device controlled by the phase modifier. In this figure, 2' designates the motor armature, 3' the commutator, 4' the brushes, and 5' the field winding connected to one phase of the three-phase alternating current mains 7', 8', 9' by the conductor 10', 11'. The field yoke has been omitted in the drawings for simplicity.

A three-electrode, high vacuum, space discharge device 23 including an anode 24, cathode 25, and grid 26 has its cathode and grid connected to the output terminals of the rotor 14' of the phase modifier 12' to thereby insure energization of the grid or input circuit of the space discharge device by a single phase alternating voltage of the desired phase with respect to the current energizing the field winding. The cathode 25 is heated to a thermionic emitting temperature by a suitable source of electrical energy 27; and the plate circuit of the space discharge device includes as a part thereof, a source of direct current, such as a generator 28, and the armature 2' of the motor.

When, now, an alternating voltage is impressed on the grid 26 of the space discharge device 23 by the phase modifier 12', there will be produced in the plate circuit an intermittent, pulsating, direct current and, since the phase of this current with respect to that of the field flux can be selected by adjusting the phase of the voltage impressed upon the grid 26 by the phase modifier 12', it is evident that the operation of the system duplicates the action of the system in Fig. 1 as previously described and illustrated in Figs. 2, 2a, and 2b.

In Fig. 4 there is shown a further embodiment of my motor control system which in structure is identical with that shown in Fig. 3, except that a gas and/or vapor filled three-electrode space discharge device 29 commonly designated a thyratron and a source of alternating current 30 of a frequency higher than that provided for exciting the field coil 5" are employed.

The principle of operation of this system can best be explained by reference to Figs. 5, 5a, and 5b wherein the alternating field flux is represented by the sinusoidal curve 31, the high frequency armature current impulses by the curve 32, and the grid control voltage by the curve 33, the ratio of armature frequency to field frequency being chosen for illustrative purpose as approximately 3½ to 1. If, now, as shown in Fig. 5, the voltage impressed on the grid of the thyratron 29 is in phase with the field flux, there will be produced in the plate circuit on the average a pair of intermittent direct current impulses a, b (shown by the shaded areas) during the time that the grid is positive with the result that the motor will rotate in what may be arbitrarily termed the positive direction. No current, of course, flows in the plate circuit when the grid voltage is negative. In Fig. 5a, the grid voltage 33 is adjusted to be in phase opposition to the alternating field flux, thus causing a reverse or negative motor rotation. When the phase of the grid voltage with respect to that of the alternating magnetic flux assumes the relation shown in Fig. 5b, there will be no motor rotation since the rectified current impulses a, b are divided between the positive and negative half-cycles of the field flux 31. It is evident that the phase of the grid voltage with respect to that of the field flux may be shifted by the phase modifier to any position intermediate those shown in Figs. 5, 5a, and 5b to thereby provide various speeds of rotation and varying torque values.

The purpose of using different frequencies in the field and armature circuits is to insure smoother and more uniform motor operation and control. In order to use the control system in Fig. 4 most effectively, it is desirable that the frequency ratio be high and/or not a whole number. In general, the higher the frequency ratio the smoother the motor control. While, in describing the system of Fig. 4, I have chosen for illustrative purposes an armature current frequency of 200 and a field excitation frequency of 60 or an approximate frequency ratio of 3½, I do not desire to be restricted thereto since any frequency ratio within the limits previously outlined may be selected to suit the conditions at hand.

The phase modifiers in the systems of Figs. 3 and 4 need only be of small dimensions since the current for supplying the motor armature is furnished by an auxiliary source in the plate circuit. Furthermore, it is to be emphasized in connection with the embodiments of Figs. 3 and 4 that the currents supplied to the field and armature windings may be interchanged, that is, the field winding may be energized by the intermittent, pulsating, direct current and the armature winding by the single phase alternating current without in any manner affecting the principle or mode of operation of the system.

According to the provisions of the patent statutes, I have set forth the principle and mode of operation of my invention and have illustrated and described what I now consider to represent its best embodiments. However, I desire to have it understood that within the scope of the appended claims the invention may be practiced otherwise than as specifically illustrated and described.

This invention may be manufactured and used by or for the Government of the United States of America for governmental purposes without payment of royalties thereon or therefor.

I claim:

1. A method of controlling the direction and speed of rotation of a commutator motor having field and armature elements which comprises the steps of energizing one of said elements by causing a flow of alternating current therein, energizing the remaining element with an intermittent, pulsating, direct current, and thereafter during energization of both elements progressively varying the relative phases of the two currents to obtain the desired phase relation therebetween whereby to control the direction and speed of rotation of said motor.

2. A method of controlling the direction and speed of rotation of a commutator motor having field and armature elements which comprises the steps of energizing one of said elements by causing a flow of alternating current therein, energizing the remaining element with an intermittent, pulsating, direct current, and thereafter during energization of both elements progressively varying the relative phases of the two currents to obtain the desired phase relation therebetween and adjusting the amplitude of the pulsating direct current whereby to control the direction and speed of rotation of said motor.

3. A method of controlling the direction and speed of rotation of a commutator motor having field and armature elements which comprises the steps of energizing one of said elements with an alternating current, energizing the remaining element with an intermittent, pulsating, direct current having a frequency of pulsation higher than that of said first mentioned current and thereafter adjusting the relative phases of the two currents whereby to control the direction and speed of rotation of said motor.

4. A method of controlling the direction and speed of rotation of a commutator motor having field and armature elements which comprises the steps of energizing one of said elements with an alternating current, energizing the remaining element with an intermittent, pulsating, direct current having a frequency of pulsation higher than that of said first mentioned current and thereafter adjusting the relative phases of the two currents and the amplitude of the pulsating direct current whereby to control the direction and speed of rotation of said motor.

5. A system for controlling the direction and speed of rotation of a commutator motor comprising in combination a commutator motor including field and armature elements, means for causing a flow of alternating current in one of said elements and means for energizing the remaining element with an intermittent, pulsating, direct current and for progressively varying the phase thereof with respect to that of the alternating current, said last mentioned means including a device having a unidirectional current output.

6. A system for controlling the direction and speed of rotation of a commutator motor comprising in combination a commutator motor including field and armature elements, means for causing a flow of alternating current in one of said elements and means for energizing the remaining element with an intermittent, pulsating, direct current and for progressively varying the phase thereof with respect to that of the alternating current, said last mentioned means including a phase modifier and a space discharge device having at least two electrodes operatively connected in circuit with said modifier.

7. In a system for controlling the direction and speed of rotation of a commutator motor, a field circuit, an armature circuit, the field circuit including means for causing a flow of alternating current therein, the armature circuit being energizable by an intermittent, pulsating, direct current and including a space discharge device having at least two electrodes and means for progressively adjusting the phase of the pulsating, direct current with respect to that of the alternating current.

8. A system for controlling the direction and speed of rotation of a commutator motor comprising in combination a commutator motor provided with field and armature windings, a source of single phase, alternating current for energizing the field winding, a phase modifier, a half-wave rectifier for rectifying the single phase, alternating current output of said phase modifier and connected in circuit with said modifier and armature winding whereby to energize the latter with an intermittent, pulsating, direct current, said phase modifier being operable to adjust the phase of the pulsating, direct current with respect to that of the alternating current energizing the field winding.

9. A system for controlling the direction and speed of rotation of a commutator motor comprising in combination a commutator motor provided with field and armature windings, a source of single phase, alternating current for energizing the field winding, a phase modifier, a multi-electrode space discharge device, the input circuit of said device including the single phase, output side of the phase modifier and being energizable by the alternating electromotive force thereof, the output circuit of said device including the armature winding and a source of electromotive force, said armature winding being energizable by an intermittent, pulsating, direct current and said phase modifier being operable to adjust the phase of the pulsating, direct current with respect to that of the alternating current energizing the field winding.

10. A system for controlling the direction and speed of rotation of a commutator motor comprising in combination a commutator motor provided with field and armature windings, means for causing a flow of alternating current in the field winding, a phase modifier, a space discharge device having an anode, cathode, and grid, the grid circuit of said device including the single phase, output side of the phase modifier and being energizable by the alternating electromotive force thereof, the plate circuit of said device including the armature winding and a source of unidirectional electromotive force, said armature winding being energizable by an intermittent, pulsating, direct current and said phase modifier being operable to adjust the phase of the pulsating direct current with respect to that of the alternating current energizing the field winding.

11. A system for controlling the direction and speed of rotation of a commutator motor comprising in combination a commutator motor provided with field and armature windings, a source of single phase, alternating current for energizing the field winding, a phase modifier, a space discharge device having an anode, cathode, and grid, the grid circuit of said device including the single phase, output side of the phase modifier and being energizable by the alternating electromotive force thereof, the plate circuit of said device including the armature winding and a source of alternating current of higher frequency than that energizing said field winding, said armature winding being energizable by an intermittent, pulsating, direct current and said phase modifier being operable to adjust the phase of the pulsating direct current with respect to that of the alternating current energizing the field winding.

12. A method of controlling the speed of rotation of a commutator motor having field and armature elements which comprises the steps of energizing one of said elements by causing a flow of alternating current therein, energizing the remaining element with an intermittent, pulsating, direct current, and thereafter during energization of both elements progressively varying the relative phases of the two currents to obtain the desired phase relation therebetween and hence the desired speed of rotation.

13. A method of controlling the direction of rotation of a commutator motor having field and armature elements which comprises the steps of energizing one of said elements by causing a flow of alternating current therein, energizing the remaining element with an intermittent, pulsating, direct current, and thereafter during energization of both elements adjusting the relative phases of the two currents to obtain the desired direction of rotation.

14. A system for controlling the speed of rotation of a commutator motor comprising in combination a commutator motor including field and armature elements, means for energizing one of said elements with an alternating current, means for energizing the remaining element with an intermittent, pulsating, direct current, and means for progressively varying the relative phases of the two currents during the energization of the aforesaid elements, whereby to obtain the desired phase relation between the currents and hence the desired speed of rotation.

15. A system for controlling the direction of rotation of a commutator motor comprising in combination a commutator motor including field and armature elements, means for energizing one of said elements with an alternating current, means for energizing the remaining element with an intermittent, pulsating, direct current and means for varying the relative phases of the two currents during the energization of the aforesaid elements, whereby to obtain the desired phase relation between the currents and hence the desired direction of rotation.

16. A system for controlling the direction of rotation of a commuator motor comprising in combination a commutator motor including field and armature elements, means for causing a flow of alternating current in one of said elements and means for energizing the remaining element with an intermittent, pulsating, direct current and for varying the phase thereof with respect to that of the alternating current to obtain the desired direction of rotation, said last mentioned means including but one device having a unidirectional current output.

HERBERT M. SCULL.